Oct. 27, 1953    R. L. JAESCHKE    2,657,323
POWER TRANSMISSION CONTROL GOVERNOR
Filed Sept. 8, 1951    2 Sheets-Sheet 1
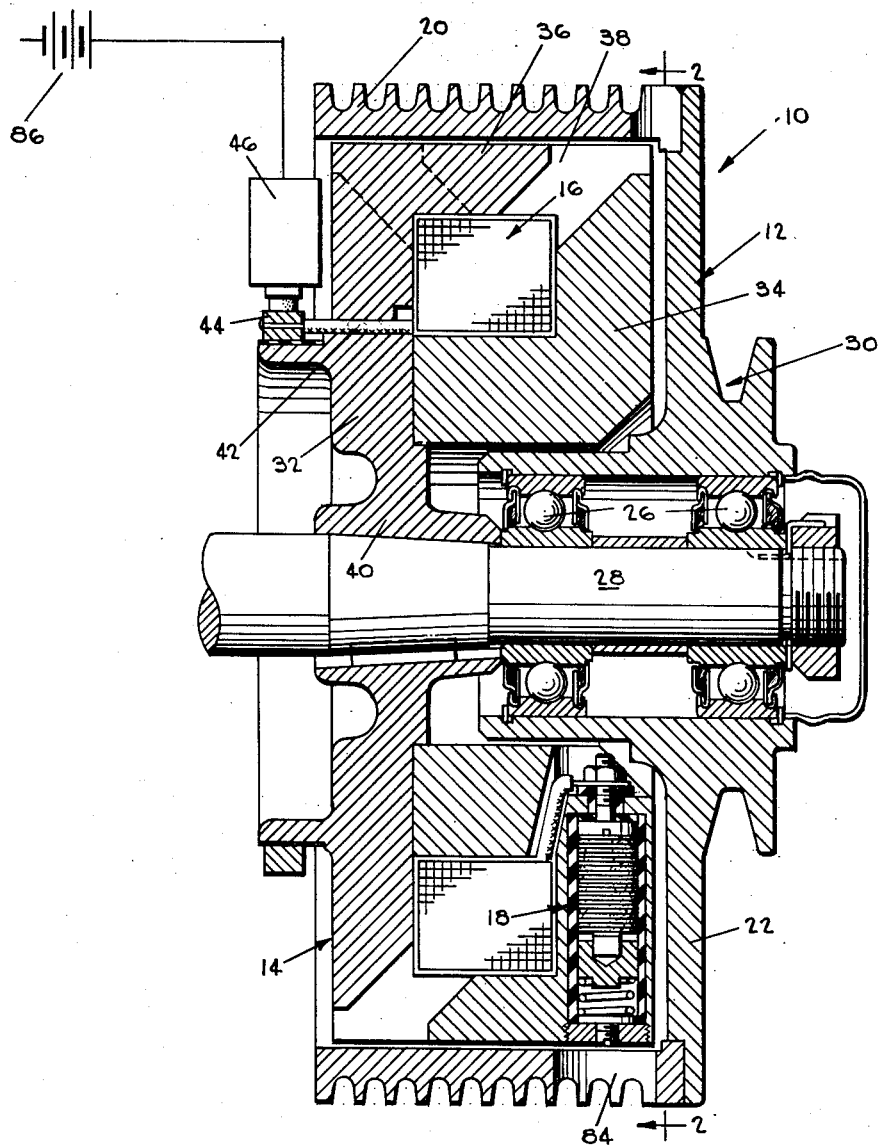
FIG_1
*INVENTOR.*
RALPH L. JAESCHKE
BY
ATTORNEYS Oct. 27, 1953  R. L. JAESCHKE  2,657,323
POWER TRANSMISSION CONTROL GOVERNOR
Filed Sept. 8, 1951  2 Sheets-Sheet 2
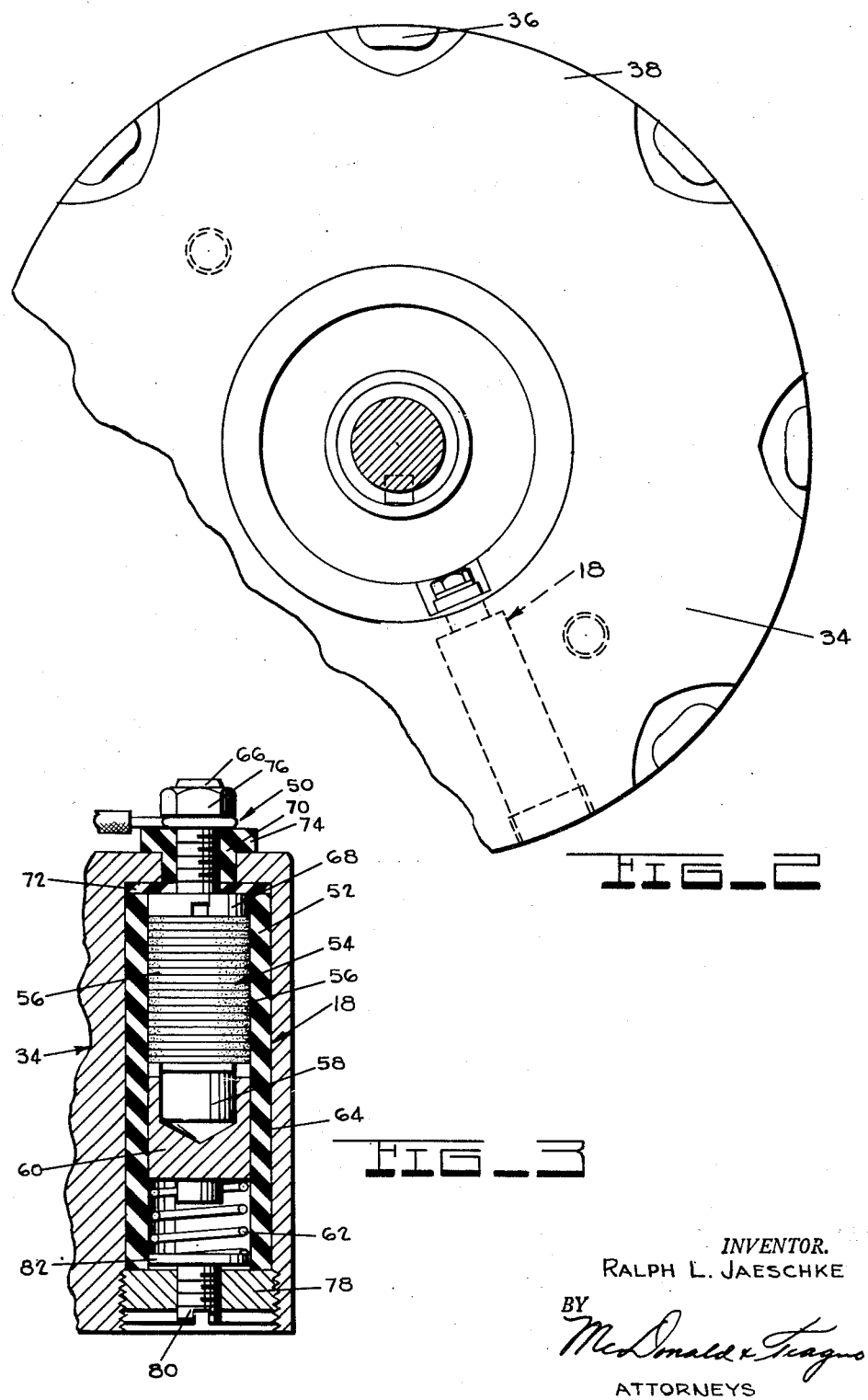
INVENTOR.
RALPH L. JAESCHKE
BY
McDonald & Fraguio
ATTORNEYS Patented Oct. 27, 1953

2,657,323

UNITED STATES PATENT OFFICE 2,657,323

POWER TRANSMISSION CONTROL GOVERNOR

Ralph L. Jaeschke, Kenosha, Wis., assignor to Dynamatic Corporation, Kenosha, Wis., a corporation of Delaware Application September 8, 1951, Serial No. 245,757

4 Claims. (Cl. 310—95)

This invention relates to power transmitting mechanism and more particularly to control means therefor.

Broadly the invention comprehends the provision of an electric governor embodying a carbon pile as a basic part thereof, adapted to be centrifugally operated for controlling current flow to an electromagnetic clutch in which it is to be incorporated.

Among the principal objects of this invention are the provision of a centrifugally operated carbon pile governor for electromagnetic eddy current clutches and the like, that:

1. Has high current carrying capacity;
2. Is free from arcing when at least a 10% torque output is applied to the output of the clutch;
3. Can be easily adjusted;
4. Is compact in structure;
5. Can be easily installed as a part of the mechanism which it is to control;
6. Is completely enclosed and as such free from dirt accumulation; and
7. Has excellent speed holding characteristics for a wide range of speed and load.

Other objects and advantages of the invention will appear from the following description taken in connection with the drawings forming a part of the specification, and in which:

Fig. 1 is a vertical cross-sectional view of an electromagnetic eddy current clutch embodying an electric governor therein;

Fig. 2 is a fragmentary end elevation view taken substantially along lines 2—2 of Fig. 1; and Fig. 3 is an enlarged cross-sectional view of the electric governor incorporated in the structure of Fig. 1.

Similar reference characters indicate corresponding parts throughout the several views of the drawings.

This electric governor was primarily devised for the purpose of providing a governor which could replace centrifugally operated contact governors without possessing the inherent drawbacks of contact governors. In so providing a governor embodying a carbon pile as a basic element thereof it was possible to provide a compact enclosed structure which is free of the shortcomings of contact governors such as arcing, dirt accumulation, difficulty of installation and adjustment, and low current carrying capacity.

The present governor can be easily incorporated as a part of the mechanism to be controlled, wherein in the case of eddy current clutches it is operative to control the flow of current to the coil of the clutch whereby as the output member of the clutch would tend to increase in speed the current to the coil would be decreased and thus account for a control in speed of the output of the clutch to a predetermined figure.

Referring to the drawings for more specific details of the invention 10 represents generally an electromagnetic eddy current clutch comprising basically a power input or drum member 12, and a power output or rotor member 14 supporting an annular field coil 16 and an electric governor 18 therein.

The drum member 12 includes an annular ring 20, and an end plate 22 fixedly secured thereto having an axially extended hub portion 24 journalled at its inner periphery upon spaced bearings 26, the bearings which are in turn mounted upon an output shaft 28 of the clutch 10. The drum member 12 is adapted to be driven from any suitable power source by way of pulley attachment with sheave 30 formed as a part of end plate 22.

The rotor 14 includes annular members 32 and 34 fixedly secured to one another with an annular opening therebetween within which the coil 16 is received and provide on their external periphery in circumferentially spaced relation to the inner periphery of ring 20 of drum member 14, interdigitated polar teeth 36 and 38. The member 32 is provided with a hub 40 having keyed connection with output shaft 28.

Coil 16 is insulated in its mounting upon and between the members 32 and 34 and is connected at one end to a suitable source of current by way of a conductor 42 to a collector ring 44 mounted in insulated relation on member 32, which ring is in turn engaged by a brush 46 having current delivered thereto. The opposite end of the coil is connected by a conductor 48 to a terminal connection 50 of governor 18.

Governor 18 includes a porcelain or other like suitable material tubular housing 52, a carbon pile 54 consisting of a plurality of like carbon discs 56 fitted for slight reciprocal movement in the housing 52, a carbon cylinder 58, bearing at one axial end upon the carbon pile 54, fitted in a cylindrical weight member 60, made of copper or like heavy material, reciprocally fitted in the housing, and a coil spring 62 bearing at one end upon the member.

The housing with the carbon pile 54, cylinder 58, weight 60 and spring 62 in assembly therein is received in a bore 64 in member 34 extending radially inwardly from open communication at the external periphery of the member 34 wherein a terminal screw 66 forming part of terminal connection 50 has its head 68 received in one open end of housing 52 with the end extremity of the head bearing against the end of the carbon pile opposite from the end having cylinder 58 bear thereon. The screw 66 is insulatingly supported in a rubber sleeve 70 fitted in an opening in member 34 connected with bore 64 in member 34 and bears upon a rubber ring 72 fitted in the bottom of bore 64, said sleeve having an annular flange 74 upon which end connection of conductor 48 is held by a nut 76 threaded on screw 66. The housing 52 has its end extremity, adjacent the open end in which head 68 of screw 66 is received, bear against one outer annular face portion of ring 72.

The housing and its contents are held in assembly in relation to member 24 by a plug 78 threaded into the open end of bore 64 bearing axially inward against one end extremity of insulating housing 52.

An adjustment screw 80 threaded in the plug 78 centrally thereof includes a head 82 received in the open end of the housing adjacent the extremity upon which plug 78 bears has axial bearing engagement of the end face of head 80 thereof against one end of coil spring 62, opposite from the end which engages weight 60. The speed control setting of the carbon pile can be varied merely by altering the compressed height of spring 62 by way of adjustment screw 80 with the screw 80 being accessible for adjustment by way of an opening 84 provided in ring 20 of drum member 12.

With one end of coil 16 connected to a current supply, such as a battery 86, by way of collector ring 44 and brush 46 the other end is grounded by way of conductor 48 connection with the governor, which governor is in turn grounded so as to complete the circuit for the coil.

In a normal governor controlled operation of the clutch 10, with power delivered to drum member 12 and with the coil energized as supplied current from battery 86 by way of engagement of brush 46 and collector ring 44 and with the coil grounded by way of governor 18, eddy currents are generated between the ring and polar members of the respective drum and rotor members resulting in a rotation of the rotor member.

As the speed of the drum member is increased a proportionate increase in speed of the rotor occurs until the rotor attains a speed at which it is to be governed wherein centrifugal force acts to throw weight 60 radially outward against spring 62 to such an extent as to compress the spring and thus reduce the pressure on the carbon pile. With the pressure on the carbon pile reduced a greater resistance to current flow is set up by the carbon pile resulting in the decrease in current flow to coil 16 and consequently a tendency toward reduction in speed of rotor member 14. This current flow control of the coil is maintained just so long as the drum member is rotating at a speed wherein through eddy current generation between it and the rotor member it tends to rotate the rotor member in excess of the speed for which the rotor member is governed. The weight 60 is purposely made of as great a weight as practical and is preferably made of copper, since it is heavier than steel or iron. In making the weight as heavy as practical the carbon pile is not adversely effected by centrifugal force tending to hold the pile discs together, thereby decreasing the resistance change ratio of the carbon pile.

Through the use of weight 60 the pressure resistance curve of the carbon pile is non-linear wherein centrifugal force at low speeds of rotor member 14 has very little effective current change while at higher speeds, large resistance changes occur when the centrifugal force acts to throw the weight 60 radially outward and thus materially relieve the pressure from the carbon pile.

Although the carbon pile governor disclosed is of specific embodiment and incorporated in an eddy current clutch it is susceptible of structural variation and application without departing from the basic concepts embodied therein and accordingly the invention is to be limited as to the extent indicated by the appended claims.

What I claim is:

1. Governing apparatus of the class described comprising a rotary partially magnetic material driving element, a rotary partially magnetic material driven element, means for effecting a magnetic drive between said elements, an electric circuit for energizing the magnetic means, and a centrifugal force operative governor mounted on the driven element including a tubular housing of insulating material fixedly mounted in the driven element with its axis extending radially of the axis of the driven element, a carbon pile resistance, connected in the circuit, mounted in the tubular housing, a predetermined weight bearing on the carbon pile within the housing radially outwardly thereof, and a spring under load, in the housing radially outwardly of the weight bearing axially upon the weight and serving to pre-load the carbon pile, said carbon pile being grounded by the way of the weight and spring to the driven element.

2. Governing apparatus according to claim 1 wherein the tubular housing is fitted in a radially extended bore in the driven element, extending from its open end at the external periphery toward the hub of the driven element, wherein a plug is threaded to the driven element in the open end of the bore, and wherein an adjustment screw is threaded in the plug with one end bearing against the spring and its opposite end extending radially outwardly through the plug.

3. Governing apparatus according to claim 1 wherein a terminal post mounted in the driven element has one portion connected to the magnetic means, and another portion disposed in the housing in axial abutting engagement to the carbon pile on the axial end opposite from the weight.

4. Governing apparatus according to claim 3 wherein the weight is made of copper or equivalent weight metal and is effective to resist centrifugal force at low speeds of the driven element such that a very little effective current change occurs.

RALPH L. JAESCHKE.

References Cited in the file of this patent

UNITED STATES PATENTS

| Number | Name | Date |
| --- | --- | --- |
| 910,473 | Thomson | Jan. 26, 1909 |
| 1,216,397 | Bailey | Feb. 20, 1917 |
| 1,955,111 | Buckler | Apr. 17, 1934 |
| 2,025,487 | Winther | Dec. 24, 1935 |
| 2,454,364 | Winther | Nov. 23, 1948 |
| 2,460,246 | Vacha | Jan. 25, 1949 |